Sept. 26, 1961      W. H. HENZLER      3,001,598
TESTING WEIGHTS FOR THE SCALES OF EGG-GRADING MACHINES
Filed May 28, 1956
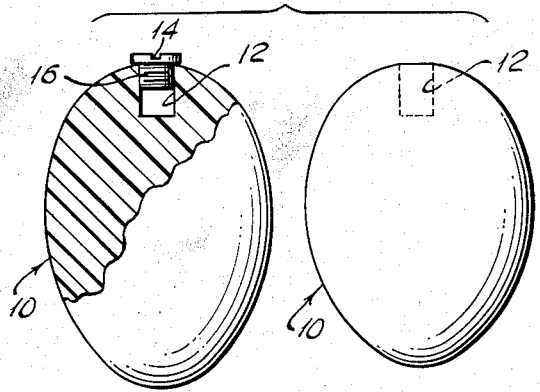
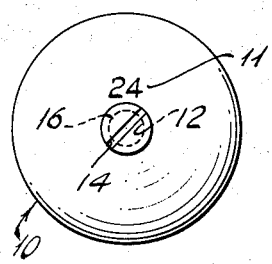
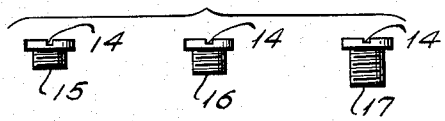
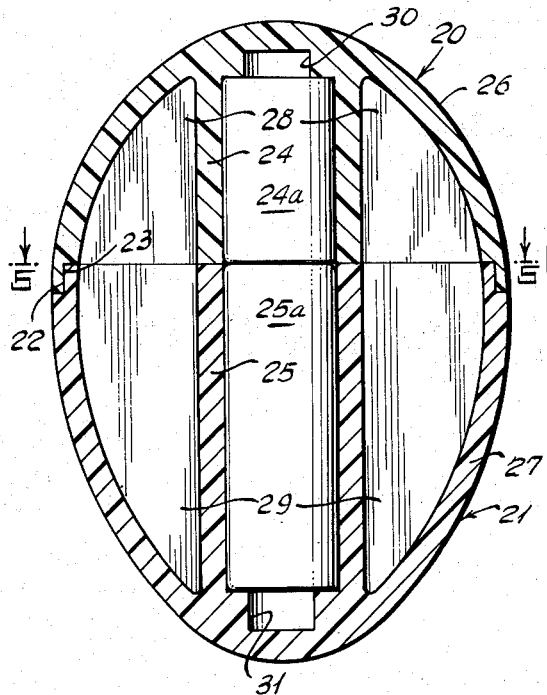
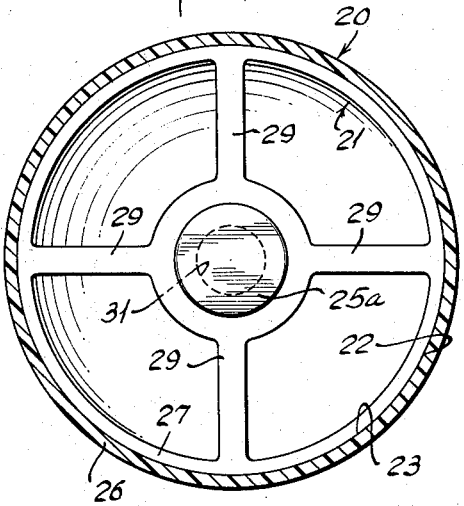
INVENTOR
WERNER H. HENZLER
BY
ATTORNEY 3,001,598
TESTING WEIGHTS FOR THE SCALES OF
EGG-GRADING MACHINES
Werner H. Henzler, P.O. Box 284, Fishkill, N.Y.
Filed May 28, 1956, Ser. No. 587,669
6 Claims. (Cl. 177—264)

The present invention relates to means for testing the weighing scales of egg-grading machines.

Eggs are usually graded according to weight, and are packaged for the retail market in cartons containing a dozen eggs which are graded, for example, as "pullet," "medium," "large," "extra large" and "jumbo," to indicate the size and weight of the eggs. In a common form of egg-grading machine used by poultrymen, the eggs are arranged for travel one by one along a chute and are caused to roll over a series of scales that are so adjusted that eggs of predetermined weight will trip the corresponding scale and thereupon they are deflected to a conveyor or chute which delivers them to a station where they are packed in the correspondingly marked cartons or the like. Because of changes in weather conditions, wear, and other factors, the scales frequently fall out of adjustment and must be re-adjusted to the weight of an egg which will be sufficient to depress or trip them, to insure that the proper weight per dozen is provided for the different grades of eggs.

It will be obvious that as the eggs are in motion while being weighed, the force which they exert on the scales is greater than that due to their static weight, and for this reason, stationary test weights or counterpoises which are placed on the scales to check them are not entirely reliable, for if they represent 1/12 of the weight of a dozen eggs of a particular weight grade, such counterpoise weight will not correspond to the true weight of the eggs in motion.

It has been proposed to employ egg-shaped bodies as counterpoises which are of hollow construction, but contain various amounts of a material of high specific gravity to bring the total weight of the test weight or counterpoise to that of a natural egg. However, in the known test weights, the egg-shaped bodies are all of the same size, while the material of high specific gravity is not uniformly distributed therein. While such egg-shaped weights have the advantage that they can be rolled along the chute of the grading machine to test the scales, they nevertheless do not simulate very closely the movement of a natural egg because of the great differences in specific gravity or density between different portions of such artificial eggs. As a result of this, and also because the test weights are all of the same size, whereas the natural eggs are not, their manner of rolling down the chute and the impact with which they strike the scales can differ considerably from that of the standard natural egg which they are intended to represent.

According to the present invention, there is provided a set of test weights for the scales of egg-grading machines, which includes a plurality of egg-shaped bodies of different sizes, made wholly or partly of plastic material and wherein the weight of the test weights is substantially uniformly distributed along the longer axis of the egg, so that the weights will roll in substantially the same manner, and will therefore arrive on the various scales under the substantially same conditions of speed and momentum, as the natural eggs of the same weight, so that greater accuracy in the calibration of the weighing scales is made possible.

A further advantage of the invention is that the poultryman can more quickly select the correct test weight for checking a particular scale, because its weight will be readily recognizable from its size. This eliminates the possibility of misreading of indicia on the test weights that might become partially coated or obliterated.

In a further development of the invention, I provide the end of the weights with a recess which is adapted to be fitted or filled with a plug of different lengths, so as to provide intermediate weights where the poultryman desires to grade additional sizes of eggs.

Two embodiments of the invention are illustrated by way of example on the accompanying drawing wherein FIG. 1 shows two plastic egg-shaped test weights for egg graders constructed in accordance with the invention, and representing a larger and a smaller member of a set of such egg-shaped weights; the larger weight being shown in section and the smaller in elevation;

FIG. 2 is a top plan view of one of the weights of FIG. 1;

FIG. 3 shows a set of plugs for increasing the weight of the test weights by a quarter ounce, a half ounce, and three-fourths of an ounce per dozen eggs.

FIG. 4 is a section through a modified form of the invention; while

FIG. 5 is a view along the line 5—5 of FIG 4.

As shown in FIGS. 1 to 3, the weights for checking the egg grader scales are in the form of solid egg-shaped bodies 10 which are preferably of the shape of a Leghorn egg, i.e., of longish form. The weights are made of plastic material of such specific gravity that the egg-shaped body has the same weight as a true egg of corresponding size. Thus, as shown in FIG. 2 by the numeral 24, indicated by the reference character 11, where the egg-shaped body is designed to check the trip device of the egg grader for eggs weighing 24 ounces per dozen, the body 10 will be of the same size as Leghorn eggs weighing 24 ounces per dozen and the density of the plastic of which it is composed will be equal to the average density of a 2 ounce egg.

This egg-shaped weight, by reason of its substantially uniform density and its very close approximation to the specific gravity of the egg which it represents, will therefore behave very much like a true egg as it rolls down the chute of the egg grader and operates the tripping device which causes it to be switched to the side chute which receives eggs of that particular weight.

It will be understood that FIG. 1 shows only two of the plurality of egg-shaped weights of the shape and composition of that shown in FIG. 1 which will be employed to make up a set of weights. The number of weights per set will depend on the number of sizes into which the eggs are graded by the poultry or the hatchery man. I prefer to include 12 of the plastic eggs in a set, ranging in weights from 18 to 29 ounces per dozen. However, a set may be composed of only 6 or 8 weights or even of more than 12 weights, depending upon the number of tripping devices on the egg grader and the weights for which they have been set.

In a further development of the invention, I provide means for varying the weight of each or of certain of the egg-shaped weights of the set, so that the egg grader can be adjusted for weights intermediate those of any two consecutive weights in a set. Thus in a hatchery where it is the practice to incubate eggs weighing from 24 to 25 ounces per dozen, it sometimes becomes necessary to incubate a larger number from a given batch of eggs to meet an unexpectedly large order for chicks, the number of eggs falling within the 24 and 25 ounce per dozen range not being sufficient to meet such order. In these circumstances, the hatchery man will adjust his grader to separate eggs weighing also, say, 23½ ounces per dozen and also those weighing, say, 25¾ ounces per dozen. To this end, I have provided, at the center of the larger end of the egg-shaped weight, removable means for varying the adjustment of the grader scale by, for example, ¼ ounce, ½ ounce or ¾ ounce per dozen eggs. Accordingly, there is provided a tapped bore 12 at the center of the larger end of the test weights and into this bore there is adapted to be fitted one of a series of threaded plugs, shown in FIG. 3, such as sheet metal screws, having slots 14 for engagement by a screw driver. The plugs have increasingly larger stems 15, 16 and 17, such that the weight of the body 10 is increased by 9, 18 or 27 grains, corresponding to ¼, ½ or ¾ ounce for a dozen eggs. The depth of the bore 12 may correspond to the length of the longest stem 17 but may be somewhat deeper, especially when the specific gravity of the plastic material is somewhat higher than the average specific gravity of the egg. The bore 12, when not completely filled by a plug, also acts to simulate the air space in the natural egg and thus contributes to the true egg-like behavior of the test weight 10 in the grading machine.

In the form of the invention illustrated in FIGS. 4 and 5, the set of testing weights includes a plurality of hollow egg-shaped bodies each composed of two halves or sections 20, 21 which are adapted to be fitted together and bonded to each other, as by means of an adhesive. To this end, the section 21 is externally rabbeted, as shown at 22, while the section 20 is correspondingly rabbeted internally, as shown at 23, so that the inner end portion of the section 20 fits over the inner end portion of the section 21. Each of the sections is provided with a cylindrical portion 24 or 25 preferably integral with respective shells 26, 27.

The cylindrical portions 24 and 25 of the two halves of the egg-shaped body are in alignment with each other and are of such lengths that when the two halves are assembled, the inner ends of the cylindrical portions are in contact with each other.

Extending from each of the cylindrical portions 24, 25 are webs 28, 29, respectively, which extend for substantially the length of the weight in the assembled condition and connect the cylindrical portions with the respective shells 26, 27 and serve to reinforce the shell sections.

The weight of the two shell sections is less than the assigned weight for the egg-shaped body and to bring the weight of the latter up to the weight of the egg which it is intended to represent, I place within each of the cylindrical portions 24, 25 a rod-shaped body 24a, 25a of higher specific gravity, such as a rod composed of metal, like steel, or other relatively heavy material. The rod can be either solid or hollow, depending upon its specific gravity. If desired, a single rod can be employed to fit within the aligned cylindrical portions 24 and 25.

The parts 24 to 28 are preferably molded of plastic material, and the plastic may be either thermoplastic or thermosetting in nature. Suitable plastic material are polystyrene and Bakelite. Should the molded test weight be found to contain too much material, the excess can be removed by drilling holes of proper size at an end of the weight, and preferably at both ends to preserve the balance, as indicated at 30 and 31, these holes being of smaller diameter than the internal diameter of the cylindrical portions 24, 25. If desired, recesses 30 and 31 can be formed during the molding operation by use of a suitable core, and after the molding of the shell sections 20, 21, any necessary calibration thereof can be accomplished either by enlarging the diameters of the spaces 30, 31 where the weight of the shell sections is too large, or by pouring the necessary amount of liquefied plastic material into such spaces should the weight be deficient, allowance being made for the weight of adhesive necessary to join the two sections 20, 21.

The rod or tube-shaped bodies 24a, 25a and the bore of the cylindrical parts 24, 25 can be the same for all of the weights in a set of testing weights, the necessary variations in the weight of the test weights in each set being then secured by the differences in the size of the outer shells, and if necessary also in the thicknesses of the shells and of their reinforcing webs 28, 29. While the cylindrical portions 24, 25 can vary in the different test weights in their inner and outer diameters, it is possible to keep at least the inner diameters of the cylindrical parts constant for all the weights and provide for any additional differences in weight by varying the length of the rods or tubes, or, in the case of tubes, by varying their internal diameters. When the rods or tubes 24a, 25a are shorter than the total length of the bores, in the cylindrical parts 24, 25, they can be cemented in place to avoid shifting.

It will be evident that while I have shown the parts 24, 25 as cylindrical, they can have any other desired cross-section, such as triangular, square or hexagonal.

The molded test weights can also be externally machined or ground to bring them down to the proper weight, if they are over-weight; while if they are short in weight, then, as already indicated, additional material can be deposited in the spaces 30, 31, and likewise in the recesses 12 (FIG. 1). In order to make the more frequently used sizes of test weights more easily recognizable, they can be given distinctive colors, preferably by embodying a pigment in the plastic material.

It will be seen from the foregoing that I have provided a set of test weights for the scales of egg-grading machines in which the test weights themselves are of the same size, shape and total weight as the eggs of the different grades which they represent, so that the test weights will behave very much like the natural eggs as they roll down the chute of the grading machine and engage the different scales. It will be noted that the material of the test weights is more or less uniformly distributed along the longer axis of the weights, and that there is no large concentration of material at any localized point. Thereby the balance and rolling quality of the test weights approximate as closely as possible those of the natural eggs.

While I have shown the test weights as divided transversely to their longitudinal axis, they can be divided also along a plane passing through such axis. Other variations within the scope of the appended claims can be resorted to without departing from the spirit of the invention.

I claim:

1. A test weight for testing the weighing scales of egg-grading machines, comprising a hollow egg-shaped body formed of two shell sections united to each other and containing longitudinal reinforcing webs, the total weight of the egg-shaped body being equal to that of a natural egg for which a weighing scale has been set, said weight including aligned cylindrical portions molded in the two halves of the egg-shaped body and united to the longitudinal reinforcing webs.

2. A test weight as defined in claim 1, wherein two halves of the egg-shaped body are rabbeted at their open ends so as to overlap, the cylindrical portion and the webs of one half being in contact with those of the other half in the assembled condition of the weight.

3. A test weight, as defined in claim 1, wherein the shell and reinforcing elements are molded of plastic material, the cylindrical parts being hollow, and including a rod of higher specific gravity than said plastic material and fitting within the cylindrical parts of the two halves of the egg-shaped body.

4. A set of test weights for the weighing scales of egg-grading machines, comprising a plurality of egg-shaped bodies of different weights corresponding to the weights of the different groups of graded eggs, said weights being of graduated sizes corresponding to the sizes of the grades of eggs, each of said egg-shaped bodies being formed of two shells bonded to each other at their contiguous inner ends, said shells each containing a hollow cylindrical part integral with the shell, and a cylindrical rod of greater specific gravity than the material of the shells fitting snugly within the cylindrical parts of the two shells, and the mass of each body being symmetrically distributed with respect to the longitudinal axis thereof and fixed in position relative thereto.

5. A set of test weights as defined in claim 4, including a symmetrically arranged transverse reinforcing web structure connecting the cylindrical part of each shell with the shell.

6. A set of test weights as defined in claim 4, wherein the opposite ends of the shell halves are provided with recesses of smaller diameter than the internal diameter of the cylindrical parts and communicating with the interior of said cylindrical parts.

References Cited in the file of this patent

UNITED STATES PATENTS

| 467,384 | Shulze | Jan. 19, 1892 |
| 787,320 | Arthur | Apr. 11, 1905 |
| 795,206 | Dreyfus | July 18, 1905 |
| 1,763,814 | Osgood | June 17, 1930 |
| 2,699,329 | Bean | Jan. 11, 1955 |

FOREIGN PATENTS

| 1,484 | Great Britain | Apr. 24, 1873 |
| 557,229 | France | Apr. 28, 1923 |